United States Patent [19]
Andrews

[11] 3,731,306
[45] May 1, 1973

[54] SEA STATE ANALYZER USING RADAR SEA RETURN

[75] Inventor: George F. Andrews, Miami, Fla.

[73] Assignee: The United States of America as represented by the Secretary of the Navy

[22] Filed: Jan. 24, 1972

[21] Appl. No.: 220,089

[52] U.S. Cl. ................................343/5 R
[51] Int. Cl. ......................G01s 7/04, G01s 9/02
[58] Field of Search ..........................343/5 R, 5 SA

[56] References Cited

UNITED STATES PATENTS 2,955,360  10/1960  Cutler ........................35/10.4
3,508,263  4/1970  Thompson ....................343/17.2 R Primary Examiner—Malcolm F. Hubler
Attorney—Richard S. Sciascia et al.

[57] ABSTRACT

A sea state analyzer samples sea clutter video from a selected range at the radar pulse repetition rate and passes the sample through an active filter to provide ocean wave analog voltage signals which are recorded. Circuitry is described which derives from the analog voltage signals and from clock signals, the average wave time period for waves of each group having a predetermined number of waves. One digital display shows the average for the last group computed while another shows the average being developed for a current group.

8 Claims, 2 Drawing Figures

SEA STATE ANALYZER USING RADAR SEA RETURN

BACKGROUND OF THE INVENTION

This invention relates to sea state analysis and more particularly to apparatus and methods for conversion of radar sea return signals into data which is meaningful and useful in determining the state of various parameters of sea conditions at a selected range or location in the area from which the sea return signals are received.

The presence of radar "sea return" or "sea clutter" has been recognized for many years together with the realization that the degree of presence varies to some extent with changes in sea conditions. While many investigators have studied radar sea return echoes, it has usually been with the objective of removing them from viewing scopes or to develop means for identifying other targets in their presence. Nonetheless, past studies have revealed sufficient recognition as well relationships between radar sea return and wind velocity and direction as well as wave height, wave period, length and velocity, to make it desirable to have some means by which one or more of these wave conditions can be obtained from the sea return signals and presented in substantially real time form. Such a means would of course be a useful tool in determining wind and sea conditions, and in early notifications of changes for research purposes as well as safety of mariners.

The advantages of garnering such data from various locations within the range of a radar without the requirement of on the spot observers or complex sensing means is, of course, obvious. The various studies and works on the subject of sea conditions and its effect on sea return are well known to those skilled in the art to which the invention pertains and so need not be recited here.

SUMMARY OF THE INVENTION

With the foregoing in mind, it is a principal object of this invention to provide a sea state analyzer apparatus which is operable in conjunction with existing radars to automatically process sea return signals and place the processed results in readily usable forms as visual displays.

Another object of the invention is to process sea return signals from within a zone at a selected range to provide a digital display readout of the average periodicity of the waves in the selected range over a predetermined number of wave perturbations, and which read-out is updated at the end of the number of waves periods being averaged so that substantially real time observations may be made of changes in such periodicity.

Still another object of the invention is the provision of reliable, compact, and inexpensive apparatus for accomplishing such processing and read-out, and which apparatus further retains a visual display of the previous read-out so that at all times there exists two readouts, the one currently being developed and the previous one, whereby amount and direction of short term changes can be ascertained at a glance.

Yet another object of the invention is the provision of sea state analyzer apparatus of the foregoing character which further provides an analog record of sea return signal amplitudes versus time for use in estimating wave height or for other, later, analysis.

As another object the invention aims to accomplish the foregoing by gating samples of sea return signals at the radar pulse-repetition rate through active filter means to analog recording means and to detector means which generates therefrom a wave frequency dependent pulse train. During each time period that a predetermined number of wave related pulses are so generated, clock derived time pulses of a predetermined frequency are being counted in one or the other of two alternatively working counters.

The invention may be further said to reside in certain novel combinations and arrangements of parts whereby the aforementioned objects and advantages are achieved, as well as others which will become apparent from the following description of a preferred embodiment.

DESCRIPTION OF THE PREFERRED EMBODIMENT

Figure 1:
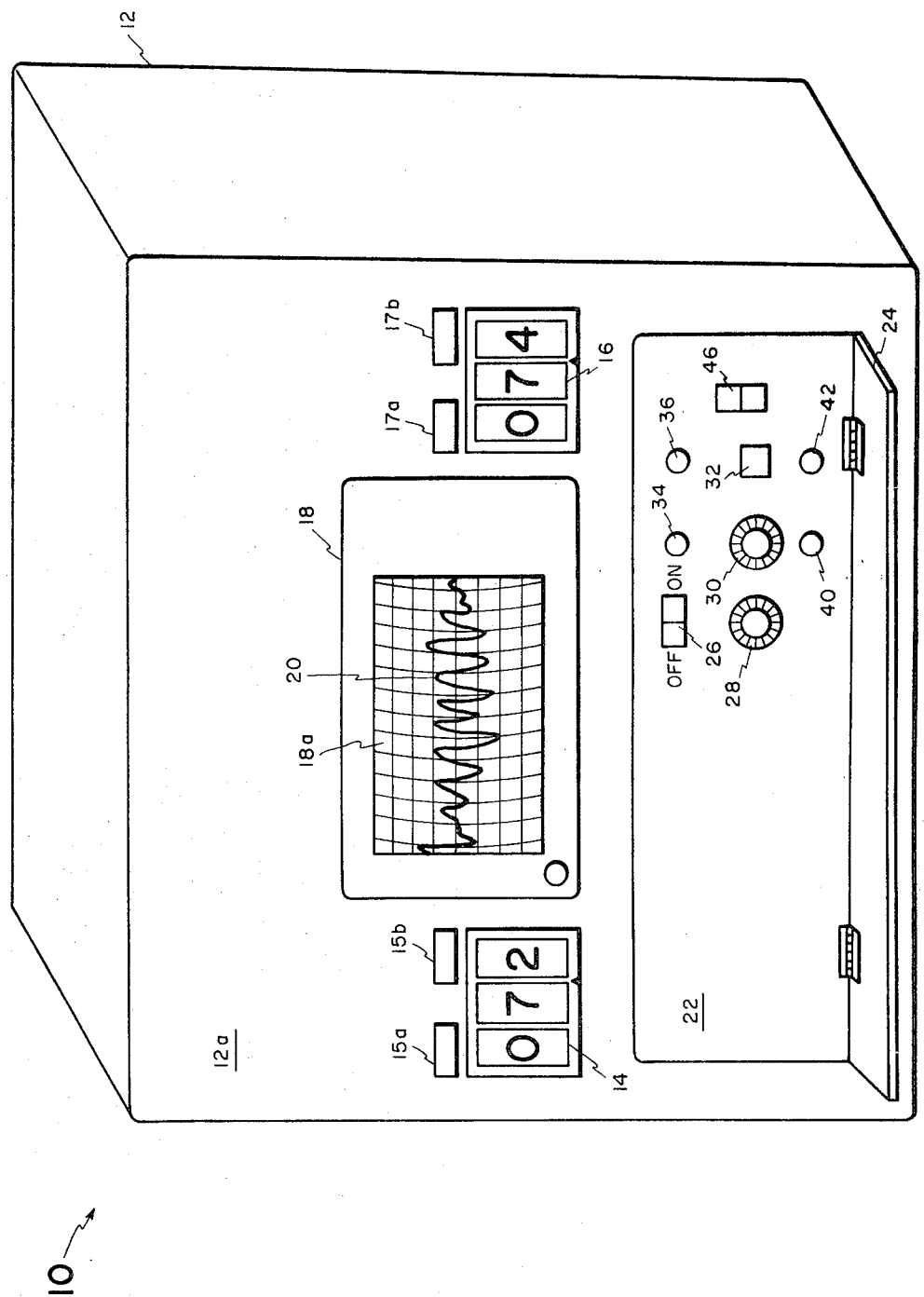
FIG. 1 is a perspective view of a sea state analyzer embodying the invention.

The sea state analyzer 10 of FIG. 1 is conveniently housed in a cabinet 12 having a front wall or panel 12a on which are mounted first and second digital display counters 14 and 16. Each of these counters, as will be explained hereinafter, is used alternately to display the stored average periodicity of a preceding sample group of waves and then to compute and display the average wave period of a current group. Arranged over the display counter 14 are indicators 15a and 15b. One of these indicators, e.g. 15a, becomes illuminated when the counter 14 is actively processing a current wave group count. The other of the indicators, 15b, becomes illuminated when the computation is completed and remains so while the next group is being analyzed and the counter 16 is active. Similar indicators 17a and 17b are positioned over the display counter 16.

Also mounted on the front panel 12a is an analog recorder 18 which provides on a moving strip 18a a permanent trace 20 of a voltage waveform derived in a manner which will be more fully described as this specification proceeds from samples of the sea return signals. Below the counters 14, 16 and the recorder 18, is a control panel 22 which is normally covered by a door 24, shown in its open position.

The control panel 22 conveniently contains a number of controls, indicators, and test points including an off and on switch 26, a delay or range gate control 28 which serves to select the range at which samples are taken, a level control 30 which adjusts the amplitude of the radar video signals applied to the sampling circuitry, a recorder on-off switch 32, an event marker button 34 which places a reference mark on the analog chart when pressed, a Δ slope indicator lamp 36 which indicates that a zero crossing in the input data has occurred, a calibration control 38 which adjusts offset voltage to sample-and-hold circuitry, left and right reset buttons 40, 42 which may be used to reset the corresponding counters 14 and 16 to zero, and a period counter 46 which displays the number of periods counted in a particular computing sequence. The functions of these control panel items will become better understood as the description proceeds.

Additionally the control panel or other location on the housing 12 may have terminals (not shown) to extract information such as gate position, sync pulse, and video signals for external oscilloscope monitoring, if desired.

Figure 2:
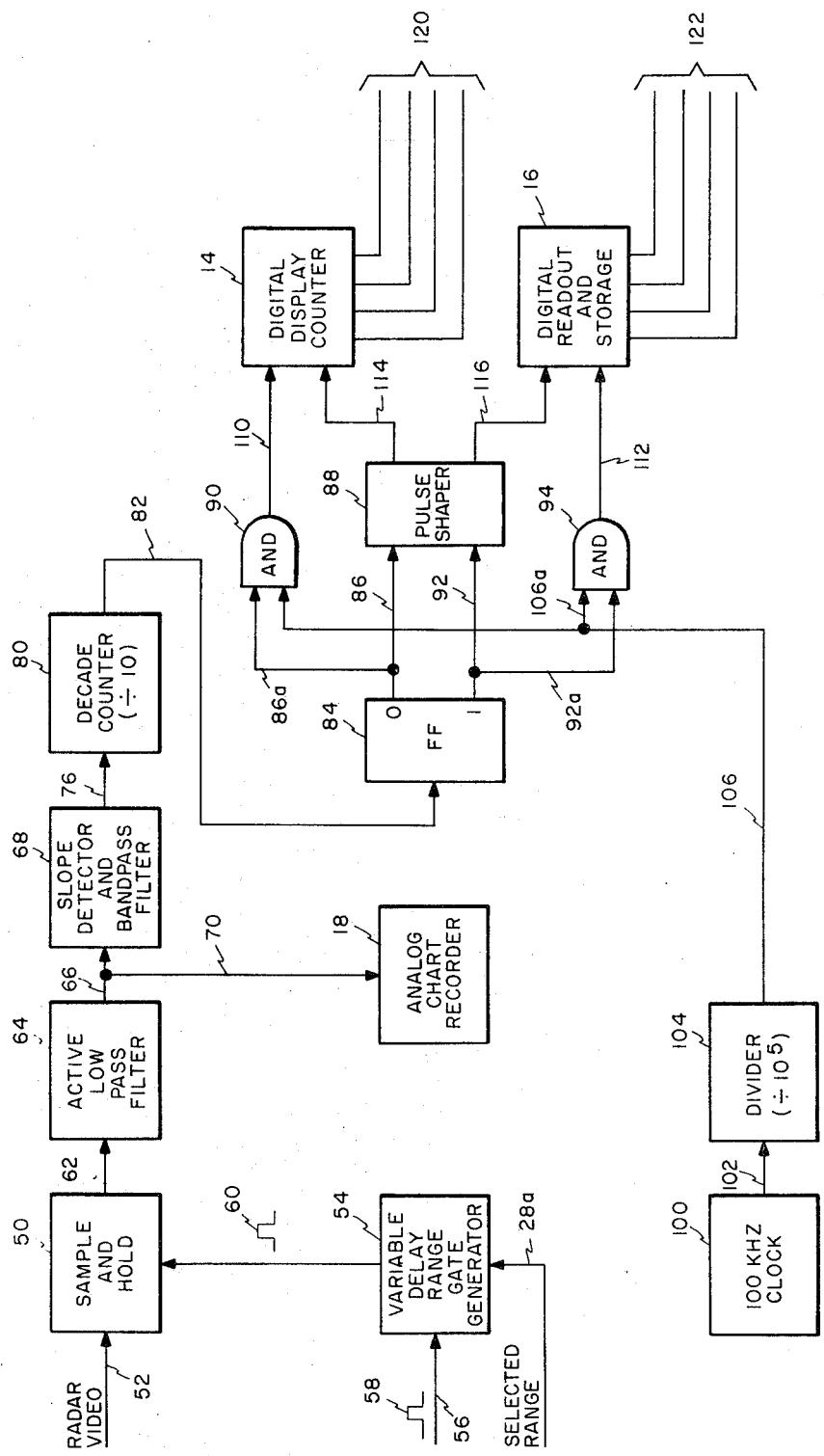
FIG. 2 is a diagrammatic illustration in block form of the circuitry of the sea state analyzer of FIG. 1.

Referring to FIG. 2, the circuitry of the analyzer 10 comprises an analog voltage sample and hold circuit 50 which receives as an input radar video signals represented by line 52. A variable delay range gate generator 54 is connected to receive, as its input via line 56, sync pulses 58 which arrive at the pulse repetition rate of the radar, e.g. 300 pulses per second. The generator 54 is responsive to positioning of a selected range input represented by line 28a and determined by the range select control 28 of FIG. 1 to provide a delayed gate pulse 60 on line 62 to the sample and hold circuit 50 for each input pulse 58. The delay of each pulse 60 with respect to the sync pulse 58 corresponds to the range at which a wave analysis is to be made. The sample and hold circuit 50 holds each sample of the amplitude of the video at the selected range until the next sample is taken. Thus, an output is derived, represented by line 62, from the sample and hold circuit 50 which is a series of analog values at the pulse repetition rate of the radar. In actual use the analyzer 10 has been used with considerable success with a radar having a one microsecond output pulse duration at the mentioned pulse repetition rate of 300 per second, operating at a 10 cm. wavelength.

The output of the sample and hold circuit 50 is passed via an active low pass filter 64 and line 66 to a slope detector and bandpass filter 68, as well as via line 70 to the analog chart recorder 18.

The filter 64 serves to reject noise outside the low frequency band which is characteristic of ocean waves, and to smooth the incremental output of the sample and hold circuit 50 into a waveform which is recorded by the recorder 18 as shown at 20 in FIG. 1. The waveform 20 varies in frequency with the actual ocean waves which are in part responsible for the sea clutter video, and in amplitude as a non-linear function of the actual wave height. The non-linearity of sea return with wave amplitude has been recognized and discussed in prior studies and reference can be had thereto as an aid to interpreting wave height from the amplitudes of the waveform 20.

Since the natural ocean wave alternations are neither pure sinusoids nor of precisely uniform duration, an average period value is needed to achieve a reliable, repeatable measurement. Such a value is obtained by having the analyzer 10 electronically compute the function:

$$\text{Average} = \overline{X} = \frac{\sum_{i=1}^{N} x_i}{N}$$

In the preferred embodiment, a sample size $N$ of ten periods has been chosen as (a), large enough to yield statistical relevance to the results, and (b), small enough to yield a reasonable elapsed time between successive measurements. The actual function executed by the analyzer 10 becomes then:

$$\text{Average period} = \overline{P} = \frac{\sum_{1}^{10} P}{10}$$

To this end, the slope detector 68 serves to provide on line 76 an output in the form of a train of pulses 78 the widths or spacings of which are dependent upon the frequency of the waves at the location being scrutinized by the radar in accordance with the range gate selection. The train of pulses 78 are fed to a divide by 10 circuit, conveniently in the form of a decade counter 80, which provides one output pulse on line 82 for every 10 input pulses 78.

The output pulses of the counter 80, which pulses may be referred to as group indicator pulses because each such pulse represents passage of a group of 10 waves, are applied to a flip-flop 84, one output of which is connected as shown by lines 86 and 86a to a pulse shaper 88 and as one input to an AND gate 90. The other, or alternate, output of the flip-flop 84 is connected as shown by lines 92 and 92a to the pulse shaper 88 and as one input to an AND gate 94.

The other inputs to the AND gates 90 and 94 are in the form of time pulses occurring once per second and derived by division from a 100 KHz clock 100 having its output connected by line 102 to a divider 104 which provides on lines 106, 106a one pulse for each $10^5$ clock pulses.

The output of the AND gate 90 is applied as shown by line 110 to the counting input of the digital display counter 14 on the front panel of the analyzer 10. Similarly the output of the AND gate 94 is applied as shown by line 112 to the counting input of the digital display counter 16 on the front panel of the analyzer. The outputs 114 and 116 of the pulse shaper 88 are connected to the respective reset terminals of the counters 14 and 16.

Now, keeping in mind that a substantial number of seconds of time will elapse for each ten ocean waves which pass the zone being scrutinized, let us assume that a group indicator pulse from the decade counter 80 has flipped the flip-flop 84 to enable the AND gate 90 and disable the AND gate 94. In this condition the one per second time pulses from the divider 104 are passed by the AND gate 90 to the counter 14 which accumulates and displays a count in terms of seconds and tenths of seconds until 10 waves have passed and the divider 80 passes another group indicator pulse to cause the flip-flop 84 to flop so as to disable the AND gate 90 and enable the AND gate 94. At this point it should be noted that the counters 14 and 16 are selected to indicate an average wave time period of one-tenth of a second for each of the one-per-second pulses received. The result is that the counters 14 and 16 each divide by 10 the time period required for 10 waves to pass and therefore the count accumulated and displayed is the desired average time period for one wave.

At the instant that the gate 94 becomes enabled, the output on line 92 from the flip-flop 84 is shaped by shaper 88 to reset the counter 16 to zero in readiness to accumulate a new count which continues during the time required for ten more waves to pass. During the time that the counter 16 is accumulating the one-per-second inputs, the counter 14 holds and displays the average number of seconds and tenths of seconds required for one wave of the previous group of ten waves to pass.

Once again, when the decade counter 80 produces the next group indicator pulse, the flip-flop 84 flips, enabling the AND gate 90, disabling the AND gate 94, and resetting the display counter 14 to zero. Accordingly, it will be recognized that one average wave period computation is always in progress while the immediately preceding completed computation results are held for display. This permits a ready comparison as to whether the average wave period is increasing or decreasing.

In order that the computed average wave periods may be recorded for later use, or fed directly to a computer for further, long term computations, the counters 14 and 16 are conveniently of the type which have a plurality of terminals, collectively indicated at 120 and 122 which provide a binary voltage condition readout of the counts in the respective counters.

The indicators 15a, 15b and 17a, 17b may be conveniently driven from the outputs of the flip-flop 84. The particular driver circuitry not being illustrated as this is well within the skill of those who would desire to practice the invention.

Obviously many modifications and variations of the present invention are possible in the light of the above teachings. It is therefore to be understood that within the scope of the appended claims the invention may be practiced otherwise than as specifically described.

What is claimed is:

1. Apparatus for use in analyzing radar sea return video signals of a radar having a predetermined transmission pulse repetition rate to determine amplitude and average periodicity of ocean waves, said apparatus comprising:
   range gate generator means for providing a range gate signal a predetermined time after each transmission pulse of said radar;
   sample and hold means, responsive to each range gate signal, for taking and holding samples of said video signals corresponding to a selected range;
   filter means for smoothing said samples into a voltage waveform analogous of ocean waves passing said range;
   means for converting said voltage waveform into a series of pulses the spacings of which correspond to the lengths of said ocean waves;
   means for providing a group indicator pulse for each predetermined number of said pulses in said series, said predetermined number corresponding to the number of waves in each group of waves for which an average wave period is to be determined;
   clock means for providing time pulses at a predetermined frequency;
   counter means for accumulating said time pulses; and
   logic means for causing said counter means to begin accumulation of said time pulses upon occurrence of one of said group indicator pulses and to end said accumulation upon the occurrence of the next of said group indicator pulses.

2. Apparatus as defined in claim 1, and wherein:
   said counter means comprises first and second resettable counters which are reset, started and stopped alternatively by said logic means so that while one of said counters is accumulating said time pulses occurring during passage of one group of waves the other of said counters stores the number of time pulses accumulated during passage of the immediately preceding group of waves.

3. Apparatus as defined in claim 2, and wherein said logic means comprises:
   first gate means for passing said time pulses to said first counter when said first gate means is enabled;
   second gate means for passing said time pulses to said second counter when said second gate means is enabled; and
   flip-flop means, responsive to said group indicator pulses, for alternatively enabling said first and second gate means.

4. Apparatus as defined in claim 3, and wherein:
   said flip-flop means having first and second outputs; and
   means coupling said first and second flip-flop outputs to said first and second counters, respectively, for resetting thereof.

5. Apparatus as defined in claim 4, and wherein:
   said first and second counters are decimal digital display counters indicating one tenth for each time pulse passed thereto;
   said predetermined number is ten; and
   said time pulses have a frequency of one per second, whereby the reading of each counter at the end of time pulse accumulation for a respective wave group is the average time period for one wave of such group in seconds and tenths of seconds.

6. Apparatus as defined in claim 5, and further comprising:
   analog chart recorder means for providing an amplitude vs. time recording of said voltage waveform output of said filter means.

7. Apparatus as defined in claim 6, and wherein:
   said range gate generator means comprises variable delay means for selectively varying said predetermined time and thereby selecting the radar range at which ocean waves are to be analyzed.

8. Apparatus as defined in claim 7, and wherein:
   said means for converting said voltage waveform into a series of pulses comprises change of slope detection circuitry.

* * * * *